United States Patent [19] — Knudsen
[11] 4,420,302
[45] Dec. 13, 1983

[54] METHOD AND APPARATUS FOR THERMALLY TREATING PULVERULENT MATERIALS

[75] Inventor: Hans B. Knudsen, Kolding, Denmark
[73] Assignee: F. L. Smidth & Co., Cresskill, N.J.

[21] Appl. No.: 321,724
[22] Filed: Nov. 16, 1981
[30] Foreign Application Priority Data
Nov. 17, 1980 [GB] United Kingdom ................ 8036838
[51] Int. Cl.[3] ........................ F27B 15/00; F26B 17/00; C04B 7/02
[52] U.S. Cl. ..................................... 432/14; 34/57 E; 106/100; 432/105; 432/106
[58] Field of Search ................... 432/14, 16, 105, 106, 432/113; 106/100; 34/57 E

[56] References Cited

U.S. PATENT DOCUMENTS

| | | | |
|---|---|---|---|
| 2,489,211 | 1/1944 | Witt | 432/67 |
| 2,776,132 | 1/1957 | Pyzel | 106/100 |
| 3,013,786 | 12/1961 | Pyzel | 432/58 |
| 3,603,568 | 9/1971 | Ritzmann | 432/58 |
| 3,799,735 | 3/1974 | Jensen | 432/16 |
| 4,002,420 | 1/1977 | Christiansen | 432/14 |
| 4,039,277 | 8/1977 | Kobayashi et al. | 432/106 |

FOREIGN PATENT DOCUMENTS

| | | |
|---|---|---|
| 2738987 | 3/1979 | Fed. Rep. of Germany . |
| 2279043 | 2/1976 | France . |
| 58-3916 | 4/1983 | Japan . |
| 457957 | 12/1936 | United Kingdom . |
| 959446 | 6/1944 | United Kingdom . |
| 1396402 | 6/1975 | United Kingdom . |
| 1446241 | 8/1976 | United Kingdom . |

*Primary Examiner*—John J. Camby
*Attorney, Agent, or Firm*—Pennie & Edmonds

[57] ABSTRACT

A method for thermally treating pulverulent material, i.e., keeping the material at a certain temperature, the treating temperature, in a desired period of time, in particular sintering, pulverulent material in a rotary kiln slightly inclined to the horizontal. The method is especially applicable for thermally treating materials which tend to become sticky at the treating temperature, in particular for sintering pulverulent materials, i.e., agglomerating these by heating without complete melting. However, the method is also useful for general thermal treatment where sintering is not intended, e.g., for burning Bauxite, Mesa and phosphate bearing ores. An example of a sintering process to which the invention is particularly applicable is the manufacture of cement clinker where the pulverulent material to be sintered is hot calcined cement raw meal. An apparatus for practicing the method of the present invention is also disclosed.

25 Claims, 14 Drawing Figures

METHOD AND APPARATUS FOR THERMALLY TREATING PULVERULENT MATERIALS

TECHNICAL FIELD

The present invention relates to a method of and an apparatus for thermally treating pulverulent material.

BACKGROUND ART

According to the traditional, and until now the only feasible method within the cement industry of sintering pulverulent materials, the material is introduced in the form of a layer of material and sintered on its way through a rotary kiln, possibly co-currently but usually countercurrently to a flow of combustion gas passed through the rotary kiln and generated by combustion of fuel introduced at an air inlet end of the rotary kiln. Usually, the raw materials are subjected to preheating and calcination, i.e., decomposition of $CaCO_3$ to CaO and $CO_2$, in suspension outside the rotary kiln. However, at least the heating from the calcination temperature to sintering temperature as well as the sintering proper take place in the rotary kiln.

This type of rotary kiln, however, is not an ideal apparatus. The essential drawback is the relative inefficient heat transfer during the process of heating the material to the treating, e.g., the sintering temperature. Because of this the machinery dimensions are necessarily large, resulting in high initial apparatus costs, a substantial heat loss and a considerable thermal inertia leading to long starting up periods and control problems as well.

Another disadvantage of the rotary kiln is the rather limited number of variable process parameters available, as a result of which it is difficult at the same time to optimize the heating up process and the thermal treating process.

Numerous proposals for eliminating these drawbacks have been made and can be classified in two groups:

The first group comprises methods for obtaining an improved heat economy of the rotary kiln.

The second group comprises attempts to replace the rotary kiln by another more efficient heat treating apparatus.

The first group includes a method for improving the heat exchange between particles of raw material and the hot combustion gases by alternatively lifting and dropping the particles during their passage down the kiln by means of trough-shaped conveyor flights to produce curtains of falling particles extending across the kiln as described in U.S. Pat. No. 3,799,735 to Jensen. An improved heat economy is this achieved but it cannot be said that the above drawbacks of the traditional rotary kiln have been eliminated satisfactorily.

To the same group belong two methods in which the rotary kiln is also used as a suspension preheater, as described in Japanese Patent Publication No. 3916 to Mamoto of 1963 and British Patent Specification No. 1,396,402 to KHD.

The Japanese Patent Publication relates to a process and kiln apparatus for burning cement wherein the heat transfer to the non-preheated material delivered to the kiln is sought to be maximized. According to this process cement raw materials are introduced either at the forward or at an intermediate position of the kiln suspended in a stream of hot air and allowed to be heated while flowing with the kiln gases reach the rear end of the kiln. Before the kiln gases reach the rear end of the kiln the material is supposed to be precipitated onto the kiln floor inside the kiln and the precipitated material is then subjected to further heat treatment while moving along the inclined kiln bottom towards its lower-lying forward end. For many reasons this method has not been in practical use. In order to obtain proper precipitation of the suspended material excessive kiln dimensions both with respect to kiln length and kiln diameter at the rear end would be necessary.

Another process and kiln apparatus, wherein the material passes through a reaction drum, e.g., a rotary kiln twice, first in suspension and then in precipitated state has been suggested. According to British Patent Specification No. 1,396,402 the material is passed through a reaction chamber constructed as a rotational drum provided with a burner, i.e., a rotary kiln, as a suspension in a gas, withdrawn from the rotary kiln in suspension, precipitated from the gas in a separator, and reintroduced into the rotary kiln in the form of a layer of material and further heat treated while moving along the inclined kiln bottom.

Instead of arranging a burner in the rotational drum a combustion chamber may be provided upstream of the reaction chamber. In this case the material is suspended in and heated by the hot exit gas from the combustion chamber.

In both cases the precipitation problems inherent in the Japanese method are solved, but these methods are not suited for treating sticky materials such as cement raw meal at a temperature close to the sintering ttmperature because the material will build up in the precipitator and quickly block it.

The second group comprises proposals for abolishing the rotary kiln entirely.

Thus, U.S. Pat. No. 2,776,132 to Pyzel discloses a method of manufacturing cement clinker according to which cement raw meal and fuel are introduced into a fluid bed where the heat generated by combustion of the fuel evokes partly calcining of raw meal and partly heating of the calcined raw meal to the temperature (approximately 1400° C.–1450° C.) at which the material sinters into cement clinker.

A later issued U.S. Pat. No. 3,013,786 to Pyzel discloses similar method differing from the previous one in that the raw material is calcined not in a fluid bed, but suspended in hot gas, whereafter the calcined material is separated from he gas and sintered in a fluid bed under simultaneous addition of fuel.

By both methods an improved heat economy is obtained because the heat transfer in suspension and in a fluid bed is far more efficient than in a rotary kiln. On the other hand another significant disadvantage is encountered which has prevented these methods from ever having been of practical use. The pulverulent materials are partly molten and extremely sticky at the sintering temperature. Consequently, a fluid bed with such material has a marked tendency to form cakings, leading to frequent interruptions in operation.

Previously, e.g., in U.S. Pat. No. 2,489,211 to Witt it has been proposed to sinter cement raw meal in suspension by head on collision of a flow of raw meal suspended in air with a flow of hot gas. This collision takes place in a reaction chamber in which the solid material is separated from the gas and sinks while the gas leaves the reaction chamber at the top.

This method has not been in practical use primarily because the material is not allowed sufficient reaction time for the mineral formation occuring at the sintering temperature, and secondly, because, should any sintering occur, the material would deposit on the walls of the reaction chamber during the separation phase as a consequence of its sticky nature, ultimately blocking the chamber.

British Patent Specification No. 959,446 to Heidelberg proposes another method of manufacturing cement clinker by suspension sintering, according to which fine raw material in a reaction zone is introduced into an ascending hot gas stream having a temperature sufficient to cause calcining and sintering of the raw material, and a flow velocity sufficient to keep the raw material suspended in the gas stream until calcined and sintered. The calcined and sintered material is precipitated from the suspension and withdrawn from the reaction zone by briefly interrupting the introduction of raw material and hot gas.

This method has been found no practical use either, partly because its batchwise nature makes it very difficult to achieve a homogeneous product, and partly because this method also leads to serious problems with cakings formed where the sticky material collides with the walls in the reaction zone.

U.S. Pat. No. 3,603,568 to Ritzmann discloses a continuous process with heating to sintering temperature and sintering of material in suspended state. The specification further discloses an apparatus for such heat treatment of fine material, e.g., cement raw material, comprising a multicyclone material preheater and a multicyclone cooler, and a burning section comprising a tubular firing chamber in which a suspension of preheated material is burned, the firing chamber being connected to a separating chamber constructed as an ordinary cyclone in which the product is precipitated.

This apparatus has not found practical use either within the cement industry, partly because of a marked tendency to the formation of cakings in the separating cyclone, and partly because realistic gas velocities and apparatus dimensions only allow a very short period of treatment which is insufficient for obtaining the desired mineral formation.

Finally, British Patent Specification No. 457,957 to Saint Jacques discloses a furnace for the treatment of pulverulent material said to be particularly suited for use in the production of cement clinker. The raw material, suspended in an air flow, is introduced tangentially at the top of this furnace which has the form of a vertically oriented cylinder. Further down additional air is introduced along with fuel. During the combustion the raw material is heated to sintering temperature in a suspended state. As the only exit for the gas is an outlet in the top of the furnace, the gas with the suspended raw material particles will follow a spiral path downwards inside the furnace, after which the gas changes direction and leaves the furnace through the gas outlet, whereas the material particles are separated and sink to a rotating hearth provided with one or more tangential burners arranged at the bottom of the furnace.

This apparatus has not been used within the cement industry. One of the reasons for this is a strong tendency to the formation of cakings on the kiln walls. I have invented a method and apparatus which avoids the aforementioned disadvantages of the prior art.

DISCLOSURE OF THE INVENTION

A method of thermally treating pulverulent material in a rotary kiln having its axis inclined to the horizontal, comprising admitting the material in suspension into the upper end of the rotary kiln, separating the material from the suspension in the upper part of the rotary kiln by introducing the suspension with a tangential velocity component, thermally treating the separated material during its passage through the rotary kiln, discharging the thermally treated material from the lower end of the rotary kiln, and withdrawing the gas from the rotary kiln through at least one of its ends.

According to the present invention a method is thus disclosed for thermally treating, in particular sintering, pulverulent material, such as cement raw meal, in a rotary kiln with an axis slightly inclined to the horizontal, presenting the advantages of heat economy achieved by heating to treating temperature in suspension, and permitting a variable and controllable period of treating, while simultaneoulsy avoiding the disadvantages mentioned above due to the sticky nature of the treated materials.

Further, it is the object of the invention to provide a compact apparatus for carrying out the method according to the invention.

Advantageously, it has now been found that the object of the invention can be achieved by a method of thermally treating, in particular sintering, pulverulent material in a rotary kiln with an axis slightly inclined to the horizontal, this method being characterized by introducing the material into the upper end of the rotary kiln suspended in an oxygen-containing gas; maintaining a flame in the upper part of the rotary kiln by introducing fuel; separating the material from the suspension in the upper part of the rotary kiln by introducing the suspension with a tangential velocity component; thermally treating, in particular agglomerating and sintering, the separated material during its passage through the rotary kiln; discharging the thermally treated material from the lower end of the rotary kiln; and withdrawing the gas from the rotary kiln through one of its ends.

As a result the thermal treatment can be performed in a particularly advantageous way. The material to be treated is introduced into the rotary kiln suspended in oxygen-containing gas. As fuel is introduced simultaneously, heat is transferred from the burning fuel to the suspended material providing a heating being far more rapid and efficient than in the traditional rotary kiln.

The critical phase during which the material is separated from the suspension takes place mainly in the upper part of the rotary kiln which acts as a horizontal cyclone because the tangential direction of the suspension causes a helical movement of the suspension in the rotary kiln.

Heat is also transferred to the material in a very effective way while the material during the separation is rotating along the inner surface of the upper part of the drum in an annular material layer presenting a by far larger heat transferring surface layer than in a traditional rotary kiln.

The improved heat transferring properties permit a radical reduction of the apparatus dimensions with consequent advantages, and the use of low grade fuel not suitable for traditional sintering owing to an insufficiently high flame temperature.

Since the rotary kiln is kept slowly rotating, a tendency of the material to stick together and form cakings will lead to no problems because the rotary kiln will act not only as a separator but at the same time in a manner known as a rotating agglomeration drum.

On the contrary a sticky character of the material will be advantageous in causing a preliminary agglomeration of the fine material during the separation, leading to an improved separation efficiency.

Even a tendency to the formation of the cakings would be advantageous, because it leads to lining-protecting crust formation in the rotary kiln as in the hot zones of an ordinary rotary kiln.

The proper thermal treatment, in particular a final agglomeration and sintering, will take place while the separated material is passing through the rotary kiln, i.e., under conditions which can be controlled independently of the heating and separating process, e.g., by varying the speed of rotation of the rotary kiln.

The material discharged from the rotary kiln may be fed directly to a cooler of known type, e.g., a grate cooler or a rotary drum cooler, but it may also be subjected to an aftertreatment in a small rotating drum before it is directed to the cooler.

The advantage of carrying out the thermal treatment in two stages is that the material separation phase and part of the thermal treatment phase are kept apart so that the latter may take place in a drum having a particularly small radius, i.e., having particularly small heat loss.

The tangential velocity component of the suspension may be provided by introducing the suspension close to the cylindrical wall of the rotary kiln in a direction substantially parallel to a tangent to the closest part of the wall and almost perpendicular to the axis of the rotary kiln.

Collisions between suspended particles and between particles and walls outside the rotary kiln may thus be kept at a minimum, i.e., any risk of formation of cakings outside the rotary kiln is minimized.

Alternatively, the tangential velocity component of the suspension may be provided by bringing the suspension into rotation before it is introduced axially into the rotary kiln.

The advantage of axial introduction of a rotating suspension is that it is possible to reduce the area of a fixed upper end wall part of the kiln and let the peripheral part of the upper end wall be fixed to the rotary kiln. Problems of procuring an air-tight connection between movable and stationary apparatus parts are thus reduced.

The gas may be withdrawn from the rotary kiln through its upper or lower end.

The advantage of withdrawing the gas through the upper end of the rotary kiln is that all risks of resuspending the precipitated material are eliminated.

However, withdrawing, the gas through the lower end of the rotary kiln presents several advantages, e.g., compensation for heat loss in the lower part of the rotary kiln, improved gas flow characteristics, and lower pressure drop.

According to an advantageous further development of the invention an improved heat economy is achieved by preheating the material to an intermediate temperature below the treating temperature before it is suspended in the oxygen containing gas.

The intermediate temperature is chosen at such a level that the material shows no tendency to become sticky, the material can be preheated by, e.g., exit gas from the rotary kiln and/or air from an air cooler cooling the end product.

According to another development of the invention the suspension is preheated to an intermediate temperature below the treating temperature before it is introduced in the rotary kiln by introduction of additional fuel into the suspension outside the rotary kiln.

A very effective heating to the treating temperature is thus achieved, partly in suspension outside the rotary kiln, partly in suspension inside the rotary kiln and partly in the above mentioned annular layer of separated material rotating around the inner surface of the upper part of the rotary kiln.

Thus, according to the invention, the method provides for thermally treating pulverulent material, i.e., keeping the material at a certain temperature, the treating temperature, in a desired period of time, in particular sintering, pulverulent material in a rotary kiln slightly inclined to the horizontal. The method is especially applicable for thermally treating materials which tend to become sticky at the treating temperature, in particular for sintering pulverulent materials, i.e., agglomerating these by heating without complete melting. However, the method is also useful for general thermal treatment where sintering is not intended, e.g., for burning Bauxite, Mesa and phosphate bearing ores.

An example of a sintering process to which the invention is particularly applicable is the manufacture of cement clinker where the pulverulent material to be sintered is hot calcined cement raw meal.

The present invention also includes an apparatus for thermally treating in particular sintering, pulverulent materials by the method according to the invention. According to the invention an apparatus is provided for thermally treating pulverulent materials in a rotary kiln having its axis inclined with respect to the horizontal, comprising means for admitting the material in suspension into the upper end of the rotary kiln, means for separating the material from the suspension in the upper part of the rotary kiln by introducing the suspension with a tangential velocity component, means for thermally treating the separated material during its passage through the rotary kiln, means for discharging the thermally treated material from the lower end of the rotary kiln, and means for withdrawing the gas from the rotary kiln through at least one of its ends.

This apparatus is preferably characterized by a rotary kiln having an axis slightly inclined to the horizontal and provided with end walls and a fuel inlet at the upper end; a suspension inlet duct connected to the upper end of the rotary kiln substantially tangentially to the inner circumferential surface of the rotary kiln; a gas outlet duct connected to one end of the rotary kiln; and an outlet for the thermally treated material at the lower end of the rotary kiln.

In one construction, the rotary kiln is provided with a constriction member situated at a distance from the suspension inlet connection constituting approximately one third of the total length of the rotary kiln.

This constriction member, which is preferably provided as a thickening of the lining in the rotary kiln, preferably has an inner diameter consitituting 40–80% of the inner diameter of the rotary kiln provides a division of the rotary kiln into a separating and a thermally treating sections ensuring a highly efficient material separation.

According to one preferred embodiment the tangential connection between the suspension inlet duct and the upper end of the rotary kiln is provided by mounting the suspension inlet duct at an inlet opening in the upper end wall close to the cylindrical wall of the rotary kiln directed substantially paralled to a tangent to the closest part of the cylindrical wall and almost perpendicular to the axis of the rotary kiln.

According to another preferred embodiment the tangential connection between the suspension inlet duct and the upper end of the rotary kiln is provided via a stationary cylindrical member, coaxial with, and smaller in diameter tha, the rotary kiln, defining a spiral flow chamber with a tangential suspension inlet and an axial suspension outlet communicating with the rotary kiln.

The connection between the gas outlet duct and the rotary kiln may be provided by mounting the gas outlet duct at an outlet opening in one or other stationary end wall of the rotary kiln.

The outlet for the thermally treated material may be an opening in the lower part of the lower end wall of the rotary kiln, which may communicate with a cooler for the discharged material.

BRIEF DESCRIPTION OF THE DRAWINGS

The present invention is described in detail below with reference to the accompanying drawings wherein.

DESCRIPTION OF THE BEST MODE OF THE INVENTION

In the FIGS. the same reference numbers are used for identical apparatus parts.

Figure 1:
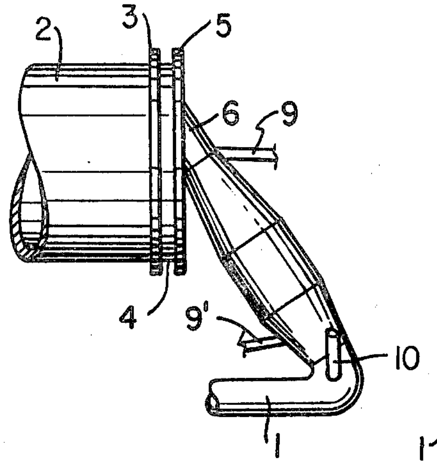
FIG 1. is a side elevational view of one embodiment of a tangential suspension inlet to a reaction chamber according to the present invention.
Figure 2:
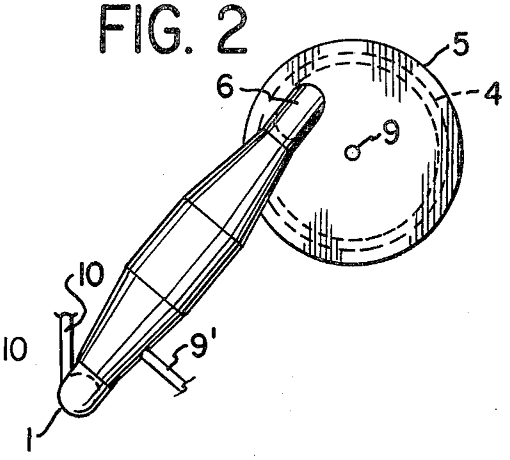
FIG. 2 is a front elevational view of the tangential inlet of FIG. 1.
Figure 3:
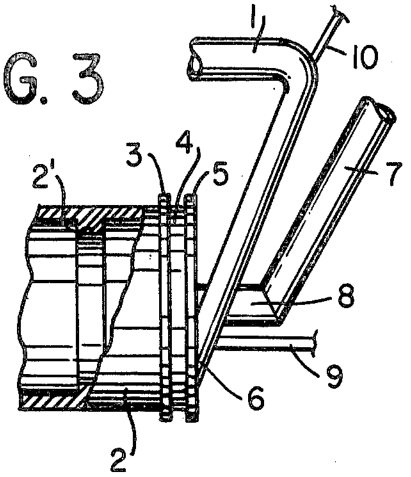
FIG. 3 is a side elevational view of an alternative embodiment of the tangential inlet of FIG. 1.
Figure 4:
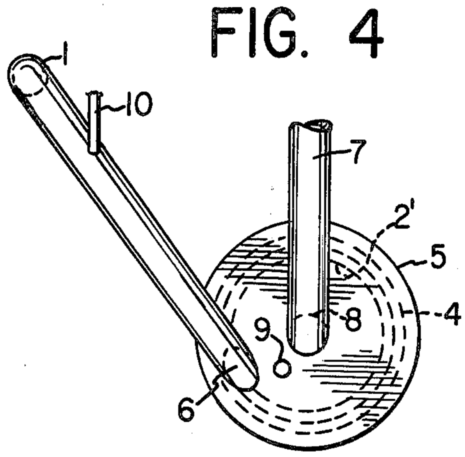
FIG. 4 is a front elevational view of the tangential inlet of FIG. 3.

FIGS. 1 and 3 are schematic side views and FIGS. 2 and 4 are corresponding schematic front views showing direct tangential inlets of a suspension inlet duct 1 into a rotary kiln 2 having an end flange 3 sealed with a seal ring 4 to a stationary end wall 5 equipped with a fuel inlet pipe 9 and an opening 6 connected with a suspension inlet pipe. In the example shown in FIGS. 1 and 2 a gas outlet duct is situated at the opposite end of the rotary kiln 2. In the example shown in FIGS. 3 and 4, a gas outlet duct 7 is situated at the opposite end of the rotary kiln 2 communicating with the rotary kiln via an opening 8 in the end wall 5. The suspension inlet duct 1 is provided with an inlet 10 for material and may be provided with an inlet 9′ for additional fuel as shown in FIGS. 1 and 2. FIGS. 3 and 4 further show a constriction member 2′ provided as a thickening of the lining in the rotary kiln 2.

Figure 5:
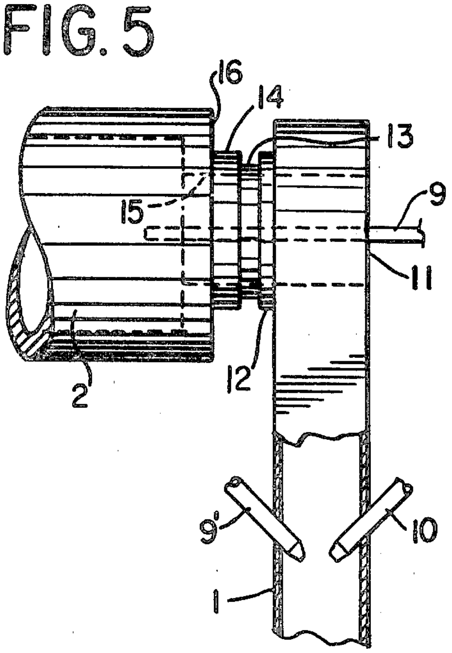
FIG. 5 is a side elevational view of a second alternative embodiment of a tangential suspension inlet to a rotary kiln according to the present invention.
Figure 6:
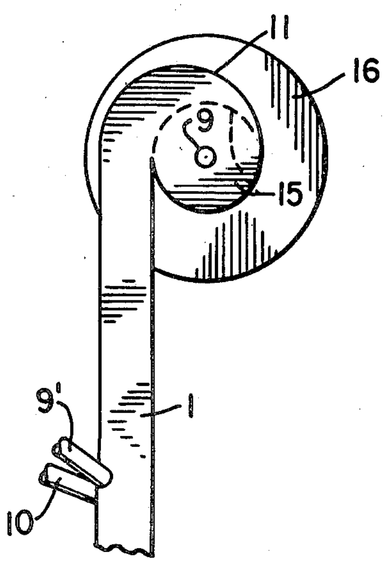
FIG. 6 is a front elevational view of the tangential inlet of FIG. 5.

FIGS. 5 and 6 show as a schematic side view and a schematic front view, respectively, a suspension inlet with a spiral flow chamber 11 provided with a tangential suspension inlet duct 1 and an axial fuel inlet pipe 9 extending into the upper part of the rotary kiln 2 and having a flange 12 sealed with a seal ring 13 to a flange 14 on the upper end of the rotary kiln 2, defining an axial suspension inlet opening 15. A peripheral part 16 of the end wall of the rotary kiln 2 is fixed to the rotary kiln. The suspension inlet duct 1 is provided with an inlet 10 for material and may be provided with an inlet 9′ for additional fuel.

Figure 7:
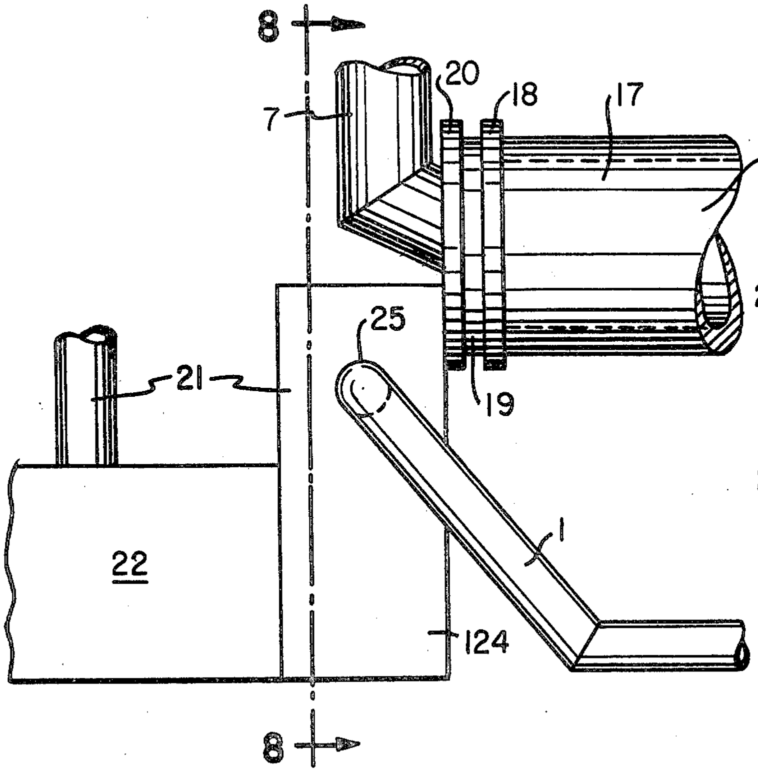
FIG. 7 is a side elevational view of one embodiment of a material outlet end of a rotary kiln according to the present invention.
Figure 8:
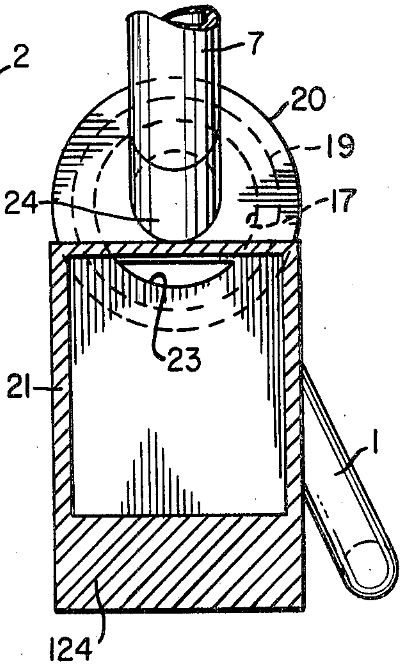
FIG. 8 is a rear elevational view of the material outlet and taken along the line 8—8 of FIG. 7.
Figure 9:
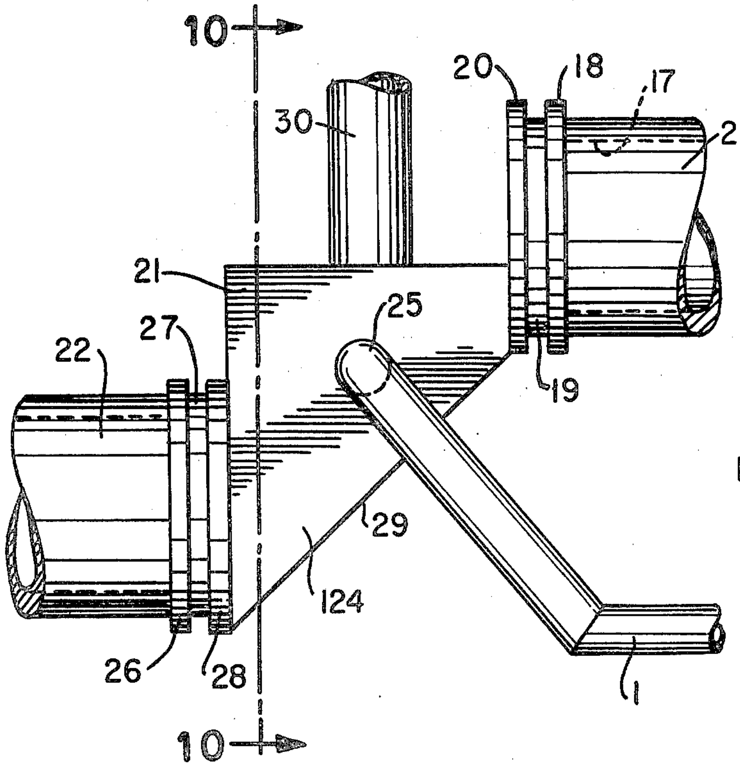
FIG. 9 is a side elevational view of an alternative embodiment of the material outlet end of FIG. 7.
Figure 10:
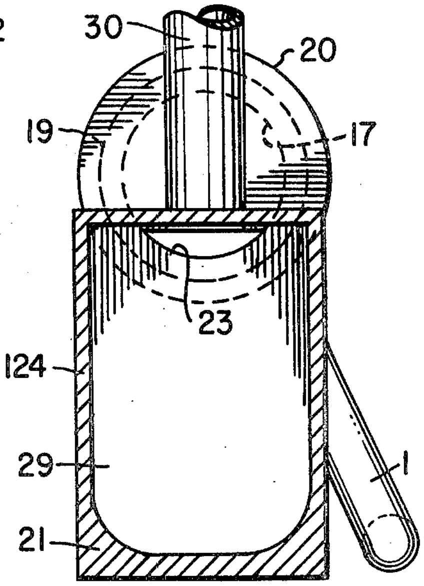
FIG. 10 is a rear elevational view of the material outlet end taken along the lines 10—10 of FIG. 9.
Figure 11:
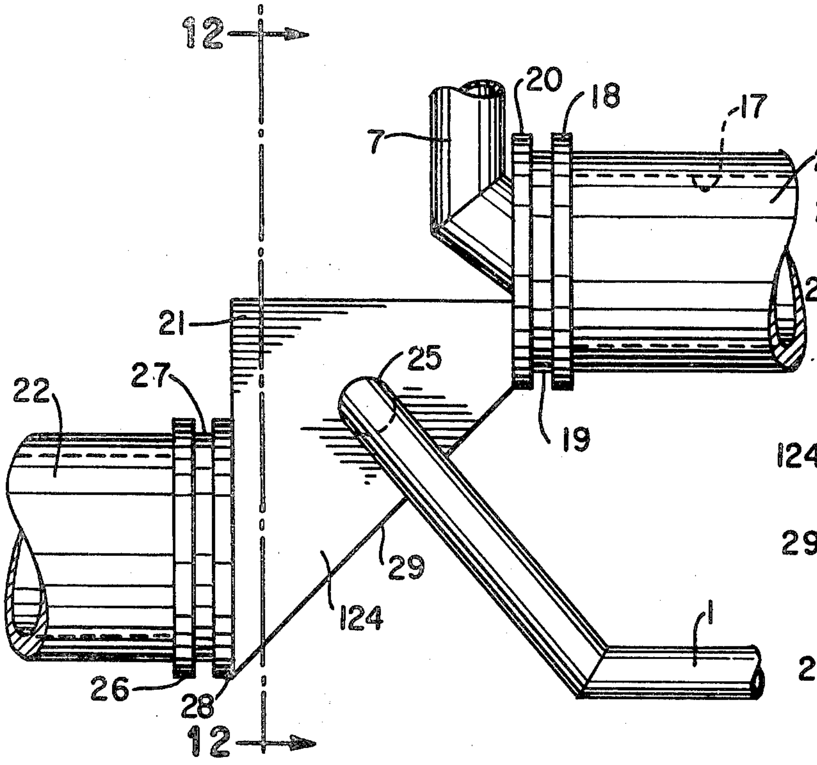
FIG. 11 is a side elevational view of a second alternative embodiment of the material outlet end of FIG. 7.
Figure 12:
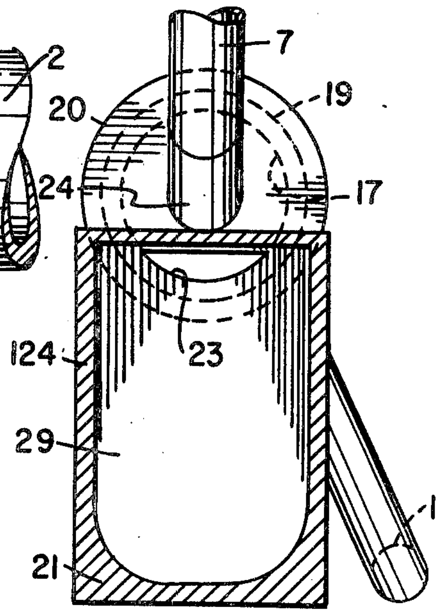
FIG. 12 is a rear elevational view of the material outlet end taken along the lines 12—12 of FIG. 11.

FIGS. 7, 9, and 11 are schematic side views showing details of the material outlet end of a rotary kiln 2. FIGS. 8, 10, and 12 are schematic sections taken on the lines 8—8, 10—10 and 12—12, respectively in FIGS. 7, 9 and 11, respectively.

FIGS. 7-12 show the lower part of the rotary kiln 2 provided with an inner lining 17 and a flange 18 sealed with a seal ring 19 to a stationary end wall 20 which is mounted to an air outlet 21 of a cooler 22. The lower part of the end wall 20 is provided with an opening 23 defining the material outlet of the rotary kiln 2 and the material inlet of the cooler 22.

In FIGS. 7, 8, 11 and 12 the upper part of the end wall 20 is provided with a second opening 24 defining an exhaust gas exit communicating with a gas outlet duct 7 situated at the lower end of the rotary kiln 2.

In FIGS. 7 and 8 the cooler 22 is a grate cooler with a double air outlet 21, the first for removing excess hot exit air from the cooler, situated at the top of the cooler, the second being box shaped with sidewalls 124 one of which is provided with an opening 25 communicating with the gas inlet end of the suspension inlet duct 1.

In FIGS. 9-12 the cooler 22 is a rotary drum cooler comprising a drum with an end flange 26 which by a seal ring 27 is sealed to a flange 28 on an exit air hood defining the cooler air outlet 21. The exit air hood is provided with an inclined bottom plate 29 leading the material from the material outlet opening 23 to the cooler drum and with sidewalls 124 one of which is provided with an opening 25 communicating with the gas inlet end of the suspension inlet duct 1.

In FIGS. 9 and 10 the top of the exit air hood is provided with a duct 30 for removing excess hot exit air from the cooler 22.

In FIGS. 11 and 12 the area of the material outlet opening 23 is greater than in FIGS. 9 and 10 permitting a part of the exit air from the cooler 22 to pass through the opening 23, quenching the gas at the lower end of the rotary kiln 2 and providing a precooling of the product before it is discharged to the cooler.

In the operation of the apparatus illustrated in FIGS. 1 to 12 the material to be thermally treated is suspended in hot exit air from the cooler 22 in the suspension inlet duct 1. The material to be treated is advantageously preheated, e.g., in suspension by exit gas from the rotary kiln 2. If desired the temperature of the material may be further increased by introducing fuel in the suspension inlet duct 1 above, below or at the same height as the material, in the latter case a spouted bed may be built into the duct providing a particularly efficient heat transfer.

The gas velocity in the suspension inlet duct 1 is kept at a level so high that the suspended particles and the gas have almost the same velocity.

The material is subjected to the final heating to the treating temperature in the upper part of the rotary kiln 2 where the suspension is introduced with a tangential velocity component, fuel being introduced at the same place.

Due to the tangential velocity component the burning material suspension will perform a rapid helical movement in the upper part of the rotary kiln 2, and the material will be precipitated from the suspension as in an ordinary horizontal cyclone.

In the upper part of the rotary kiln 2 the precipitated material will rotate along the inner surface in an annular material layer, but due to friction the speed of rotation will decrease as the material moves further into the rotary kiln 2 and finally the precipitated material now heated to the treating temperature will settle on the bottom of the rotary kiln 2 and form a material layer which will be carried through and subjected to thermal treatment in the rotary kiln with a retention time being determined by the rotational speed of the rotary kiln.

At the lower end of the rotary kiln 2 the material is discharged through the material outlet opening and introduced into the air cooler 22 where it is cooled flowing countercurrently to cooling air. The hot exit air from the cooler 22 or a part thereof is introduced into the suspension inlet duct 1, the air flow being provided by means of a fan (not shown) and, if desired, being controled by means of a valve (not shown) in the air inlet end of the suspension inlet duct 1.

A certain amount of (false) air may bypass the suspension inlet duct 1, and pass directly from the cooler 22 to the lower end of the rotary kiln 2 via the material outlet opening 23. However, if desired, the amount of false air can be kept very low by minimizing the area of the material outlet opening 23. As mentioned above a certain amount of false air may be desirable, especially when the gas outlet is arranged at the lower end of the rotary kiln 2, because it provides a quenching of the exit gas from the rotary kiln and a precooling of the thermally treated material.

Figure 13:
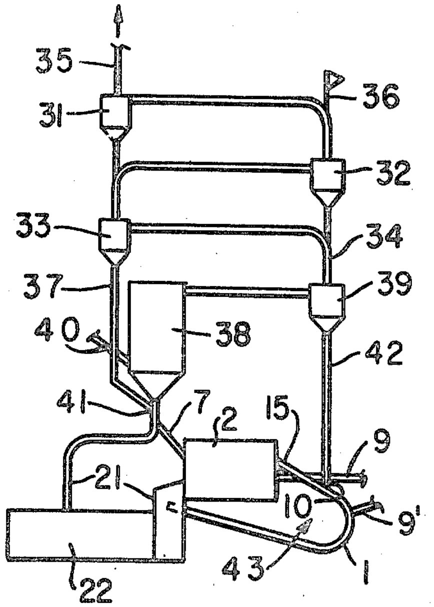
FIG. 13 is a schematic illustration of one embodiment of a cement producing plant comprising the apparatus according to the invention as a sintering reactor or a traditional rotary kiln.
Figure 14:
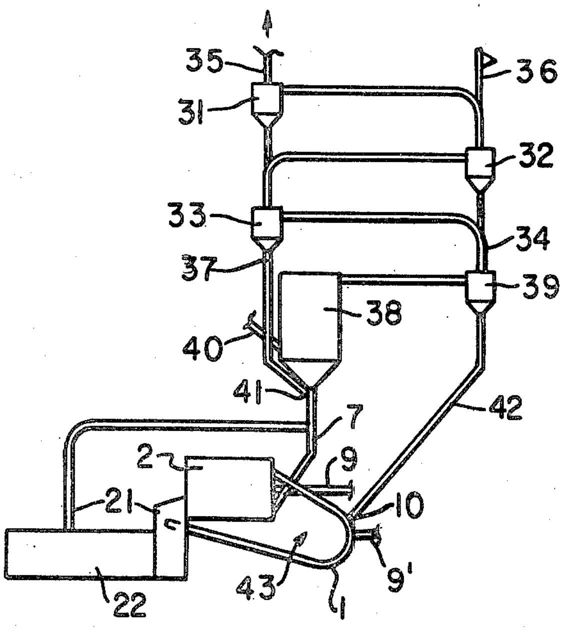
FIG. 14 is a schematic illustration of an alternative embodiment of a cement producing plant comprising the apparatus according to the invention as a sintering reactor or a traditional rotary kiln.

The plant shown in FIGS. 13–14 comprises a suspension preheater comprising cyclones 31, 32 and 33, and inlet 34 and an outlet 35 for heating gas, and an inlet 36 and an outlet 37 for pulverous cement raw material; a suspension calciner with a calcination chamber 38 provided with a separating cyclone 39, an inlet 40 for fuel, and an inlet 41 for combustion air and preheated raw material, and an outlet 42 for calcined material from the separating cyclone 39; and a sintering apparatus 43 comprising a rotary kiln 2, rotatable around an axis slightly inclined to the horizontal provided with a fuel inlet 9, a suspension inlet duct 1 provided with inlets 9′ and 10 for fuel and material, respectively, the inlet duct 1 having a first end connected to an air cooler 22 and a second end connected to the upper end of the rotary kiln 2, and the rotary kiln 2 being provided with a gas outlet duct 7 connected to the lower or upper end of the rotary kiln 2 in FIGS. 13, 14 respectively.

The arrangement of the upper end of the rotary kiln 2 in FIG. 13 may be as shown in FIGS. 1, 2 or FIGS. 5, 6 and at the lower end as shown in FIG. 7, 8 or 11, 12. As mentioned with reference to FIGS. 9–12, the rotary drum cooler 22 may be replaced by a grate cooler. The arrangement at the upper end of the rotary kiln 2 in FIG. 14 may be as shown in FIGS. 3, 4, or FIGS. 5, 6 and at the lower end as shown in FIG. 14 or as shown in FIGS. 9, 10. The gas outlet duct 7 may be axially connected to the rotary kiln 2.

An air cooler 22 for cooling the sintered material has an air outlet 21 connected to both the inlet duct 1 of the sintering apparatus 43 and the air inlet 41 of the calciner.

The inlet duct 1 is arranged to introduce material with a tangential component into the rotary kiln 2 as shown in more detail in FIGS. 1–4.

FIGS. 13 and 14 show a grate cooler as cooler 22 which may be provided with a duct (not shown) for excess hot cooling air. Of course the grate cooler can be replaced by a rotary drum cooler.

The method of thermally treating pulverulent material is well suited for sintering material comprising oxides of calcium, silicon, aluminum, and iron, such as calcined cement raw meal to cement clinker. The method can also advantageously be used when extracting alumina from low grade alumina bearing ores, e.g., by the so-called lime and lime/soda processes where a fineground mixture of alumina bearing ore and limestone/limestone and alkali metal carbonate, respectively, are calcined and sintered to clinker containing the alumina component in soluble form as calcium aluminate and alkali metal aluminate, respectively, and the impurities in insoluble form, e.g., the $SiO_2$ component as insoluble dicalciumsilicate.

When using the apparatus shown in FIG. 13 or 14, for manufacturing cement clinker the procedure will normally be to introduce and preheat the cold cement raw meal in the suspension preheater, suspending the preheated raw meal in an oxygen containing gas in the calcination chamber 38 with simultaneous addition of fuel. The calcined material is then separated from the gas in the separating cyclone 39 and suspended in hot oxygen containing gas, i.e., hot exit air from the clinker cooler 22, in the suspension inlet duct 1.

The hot calcined material coming from the calciner will have an oxide composition typically within the range CaO: 62–66%; $Al_2O_3$: 6–10%; $SiO_2$: 17–24% and $Fe_2O_3$: 1–6% and a temperature of 800°–850° C.

Fuel such as oil, gas or coal dust may be introduced in the hot air flow in the suspension inlet duct 1 before, after, simultaneously with, or together with the hot precalcined cement raw meal.

In a few seconds the material temperature will be raised to an intermediate temperature between the calcination and sintering temperature. The hot suspended material is then introduced in the upper end of the rotary kiln 2, fuel being simultaneously introduced at the same place via the pipe 9, possibly with the addition of further secondary air. The material temperature will be further raised to 1350°–1450° C., being the sintering temperature of the materials involved.

In the upper part of the rotary kiln 2 the material is separated from the suspension and the separated agglomerating material is then sintered on its way down towards the material outlet. The retention time is controllable by setting the rotational speed of the rotary kiln 2, and will normally be 7–12 minutes.

The temperature of the discharged cement clinker is typically approximately 1400°-1500° C. Then discharged clinker is then air cooled in the clinker cooler 22.

Part of the hot cooling air, typically having a temperature of 750°-900° C., is used as the above mentioned hot air in which the calcined raw meal is suspended in the suspension inlet duct 1. The remaining part is passed to the calciner in which it is used as combustion air for the raw meal calcining.

The hot gas discharged from the rotary kiln 2 typically has a temperature of 1400°-1500° C. and is introduced through the duct 1 to the bottom of the calcination chamber 38 and is used as a supplementary heat source for calcining the material. The exit gas from the calciner is used in a known manner for preheating the raw meal to be calcined.

To avoid problems of clogging in the exit pipe for the rotary kiln exit gas, it is advantageous to introduce uncalcined or calcined raw meal into the hot gas flow at a position close to the rotary kiln 2. The raw meal is at once suspended in the gas reducing the gas temperature of approximately 850°/1050° C. when uncalcined/calcined material is introduced. At these temperatures the risk of cakings is completely eliminated. Then the gas flow may be introduced into a separator, e.g., a cyclone separator for separating solid material which is passed to the calciner or to the suspension inlet duct 1 when calcined material is introduced.

Typical rotary kiln 2 dimensions include a diameter of 4 m (meters), and a length of 12-20 m (meters). The rotational speed of the rotary kiln is typically 1-4 r.p.m. (revolutions per minute). A typical inclination of the rotary kiln wll be 3°. The degree of filling in the rotary kiln is typically 15-20 percent. The production capacity of such a plant is 2000 tons/24 hrs.

I claim:

1. Method of thermally treating pulverulent material in a rotary kiln having its axis inclined to the horizontal, the rotary kiln having an upper end and a lower end, an upper portion and a lower portion, comprising:

introducing the material and fuel in suspension in a gas into the upper portion of the rotary kiln adjacent its upper end by introducing the material in suspension with a tangential velocity component;

thermally treating the material in the upper portion so as to raise the temperature of the material to approximately its sintering temperature;

separating the material from the suspension in the upper portion of the rotary kiln as a result of said introducing the material in suspension with a tangential velocity component;

further thermally treating the separated material during its passage through the rotary kiln;

discharging the thermally treated material from the lower end of the rotary kiln; and withdrawing the gas from the rotary kiln through at least one of its ends.

2. Method of thermally treating, such as by sintering, pulverulent material in a rotary kiln having an upper end and a lower end, an upper portion and a lower portion, the rotary kiln having an axis slightly inclined to the horizontal, comprising:

introducing the material and fuel in suspension in a gas into the upper portion of the rotary kiln adjacent its upper end by introducing the material in suspension with a tangential velocity component;

thermally treating the material in suspension in the upper portion of the upper end of the rotary kiln;

separating the material from the suspension in the upper portion of the rotary kiln as a result of said introducing the material in suspension with a tangential velocity component;

further thermally treating, such as by agglomerating and sintering, the separated material during its passage through the rotary kiln;

discharging the thermally treated material from the lower portion of the lower end of the rotary kiln; and withdrawing the gas from the rotary kiln through at least one of its ends.

3. The method according to claim 2 comprising providing the tangential velocity component of the suspension by introducing the suspension adjacent to a portion of the cylindrical wall of the rotary kiln in a direction substantially parallel to a tangent to the closest part of said portion of the cylindrical wall and generally perpendicular to the axis of the rotary kiln.

4. The method according to claim 2 comprising providing the tangential velocity component of the suspension by bringing the suspension in rotation before it is introduced axially into the rotary kiln.

5. The method according to any of claims 2-4 comprising withdrawing the gas from the rotary kiln through the upper end.

6. The method according to any of claims 2-4 comprising withdrawing the gas from the rotary kiln through its lower end.

7. The method according to any of claims 2-4 comprising preheating the material to a predetermined intermediate temperature below the treating temperature before the material is suspended in the gas.

8. The method according to any of claims 2-4 comprising preheating the suspension to a predetermined intermediate temperature below the treating temperature before the suspension is introduced into the rotary kiln by introduction of additional fuel into the suspension outside the rotary kiln.

9. Method of thermally treating, in particular sintering, pulverulent material in a rotary kiln with an axis slightly inclined to the horizontal, the rotary kiln having an upper end and a lower end, an upper portion and a lower portion, characterized in introducing the material and fuel in the upper portion of the rotary kiln adjacent its upper end, the material being suspended in an oxygen containing gas, thermally treating the material in the upper portion by maintaining a flame in the upper portion of the rotary kiln by the introduction of fuel, separating the material from the suspension in the upper of the rotary kiln as a result of said introducing the material in suspension with a tengential velocity component, further thermally treating, in particular agglomerating and sintering, the separated material during its passage through the rotary kiln, discharging the thermally treated material from the lower end of the rotary kiln and withdrawing the gas from the rotary kiln through one of its ends.

10. The method according to claim 9 wherein the material is introduced into the rotary kiln with such a tangential velocity component so as to cause a rapid helical or spiral movement of the material as it is introduced into the rotary kiln thereby to act substantially as a helical cyclone.

11. The method according to claim 10 wherein the pulverulent material is pulverous cement raw meal.

12. Apparatus for thermally treating pulverulent materials including a rotary kiln having its axis inclined with respect to the horizontal, the rotary kiln having an upper end and a lower end, an upper portion and a lower portion, comprising:

means for introducing the material and fuel in suspension in a gas into the upper portion of the rotary kiln adjacent its upper end by introducing the material in suspension with a tangential velocity component;

means for thermally treating the material in the upper portion as to raise the termperature of the material to approximately its sintering temperature;

means for separating the material from the suspension in the upper portion of the rotary kiln as a result of said introducing the material in suspension with a tangential velocity component;

means for further thermally treating the separated material during its passage through the rotary kiln;

means for discharging the thermally treated material from the lower end of the rotary kiln; and means for withdrawing the gas from the rotary kiln through at least one of its ends.

13. Apparatus for thermally treating, such as by sintering, pulverulent materials including a rotary kiln having an upper end and a lower end, and upper portion and a lower portion, the rotary kiln having an axis slightly inclined to the horizontal, comprising:

means for introducing the material and fuel in suspension in a gas into the upper portion of the rotary kiln adjacent its upper end by introducing the material in suspension with a tangential velocity component;

means for thermally treating the material in suspension in the upper portion of the upper end of the rotary kiln;

means for separating the material from the suspension in the upper portion of the rotary kiln as a result of said introducing the suspension with a tangential velocity component;

means for further thermally treating, such as by agglomerating and sintering, the separated material during its passage through the rotary kiln;

means for discharging the thermally treated material from the lower portion of the lower end of the rotary kiln; and means for withdrawing the gas from the rotary kiln through at least one of its ends.

14. The apparatus according to claim 13 further comprising means to introduce fuel into said suspension.

15. The apparatus of claim 14 wherein the separating means includes a suspension inlet duct connected to the upper end of the rotary kiln substantially tangentially to the inner circumferential surface of the rotary kiln.

16. The apparatus of claim 15 wherein the gas withdrawing means includes a gas outlet duct connected to at least one end of the rotary kiln.

17. The apparatus according to claim 16 wherein the discharging means includes an outlet for the thermally treated material at the lower end of the rotary kiln.

18. The apparatus according to claim 17 wherein the rotary kiln is provided with a constriction member positioned at a distance from the suspension inlet duct constituting approximately one third of the total length of the rotary kiln.

19. The apparatus according to any of claims 15–18 wherein the tangential connection between the suspension inlet duct and the upper end of the rotary kiln is provided by mounting the suspension inlet duct at an inlet opening of the upper end wall adjacent to the cylindrical wall of the rotary kiln in a direction substantially parallel to a tangent to the closest part of said cylindrical wall and generally perpendicular to the axis of the rotary kiln.

20. The apparatus according to any of claims 15–18 wherein the tangential connection between the suspension inlet duct and the upper end of the rotary kiln is provided via a stationary cylindrical member being coaxial with and smaller in diameter than the rotary kiln defining a spiral flow chamber with a tangential suspension inlet and an axial suspension outlet communicating with the rotary kiln.

21. The apparatus according to claim 20 wherein said means for admitting the material with a tangential velocity component in the upper end portion of the rotary kiln is such as to admit the material into the rotary kiln with a tangential velocity component so as to act substantially as a horizontal cyclone with a rapid helical or spiral movement of the material in the rotary kiln.

22. The apparatus according to claim 21 wherein said pulverulent material is in the form of pulverous cement raw meal.

23. Apparatus for thermally treating, in particular sintering, pulverulent material, characterized in comprising:

a rotary kiln having an axis slightly inclined to the horizontal and provided with stationary end walls and a fuel inlet at the upper end, the rotary kiln having an upper end and a lower end as well as an upper portion and a lower portion;

a suspension inlet duct connected to the upper end of the rotary kiln substantially tangentially to the inner circumferential surface of the rotary kiln for introducing the material in suspension in a gas into the upper portion of the rotary kiln adjacent its upper end by introducing the material in suspension with a tangential velocity component;

means for introducing fuel to the material in suspension so as to provide for thermally treating the material in suspension in the upper portion of the upper end of the rotary kiln;

the material being separated from the suspension in the upper portion of the rotary kiln as a result of said introducing the material in suspension with a tangential velocity component;

means for further thermally treating the separated material during its passage through the rotary kiln;

a gas outlet duct connected to one end of the rotary kiln; and an outlet for the thermally treated material at the lower end of the rotary kiln.

24. A method of sintering pulverulent material in a rotary kiln having its axis inclined to the horizontal, the rotary kiln having an upper end and a lower end, an upper portion and a lower portion, comprising:

introducing the material and fuel in suspension in a gas into the upper portion of the rotary kiln adjacent its upper end by introducing the material in suspension with a tangential velocity component;

thermally treating the material in the upper portion so as to raise the temperature of the material to approximately its sintering temperature;

separating the material from the suspension in the upper portion of the rotary kiln as a result of said introducing the material in suspension with a tangential velocity component;

further thermally treating the separated material during its passage through the rotary kiln;

discharging the thermally treated material from the lower end of the rotary kiln; and withdrawing the gas from the rotary kiln through its lower end.

25. An apparatus for sintering pulverulent material in a rotary kiln having its axis inclined with respect to the horizontal, the rotary kiln having an upper end and a lower end, an upper portion and a lower portion, comprising:

an inlet duct disposed at the upper end for introducing the material in suspension in a gas into the upper portion of the rotary kiln adjacent its upper end by introducing the material in suspension with a tangential velocity component;

means for introducing fuel into the upper portion adjacent the upper end of the rotary kiln for thermally treating the material in the upper portion so as to raise the termperature of the material to its sintering temperature;

the material being separated from the suspension in the upper portion of the rotary kiln as a result of said introducing the material in suspension with a tangential velocity component and the material settling on the lower portion of the rotary kiln and carried thereon;

means for further thermally treating the separated material during its passage through the rotary kiln;

an outlet duct disposed at the lower end for discharging the thermally treated material from the lower end of the rotary kiln; and means for withdrawing the gas from the rotary kiln through its lower end.

* * * * *

UNITED STATES PATENT AND TRADEMARK OFFICE

CERTIFICATE OF CORRECTION

PATENT NO. : 4,420,302

DATED : December 13, 1983

INVENTOR(S) : Hans Brun Knudsen

It is certified that error appears in the above-identified patent and that said Letters Patent is hereby corrected as shown below:

In Column 5, line 65, "air" should read --exit air--.

In Column 7, line 7, "tha" should read --than--.

Signed and Sealed this

*Second* Day of *October 1984*

[SEAL]

*Attest:*

GERALD J. MOSSINGHOFF

*Attesting Officer* *Commissioner of Patents and Trademarks*